Aug. 14, 1956 — L. G. HILKEMEIER — 2,758,687
TRANSMISSION
Filed March 18, 1952 — 2 Sheets-Sheet 1

LOUIS G. HILKEMEIER
*INVENTOR.*
BY
*Attorney*

Aug. 14, 1956     L. G. HILKEMEIER     2,758,687
TRANSMISSION
Filed March 18, 1952     2 Sheets-Sheet 2
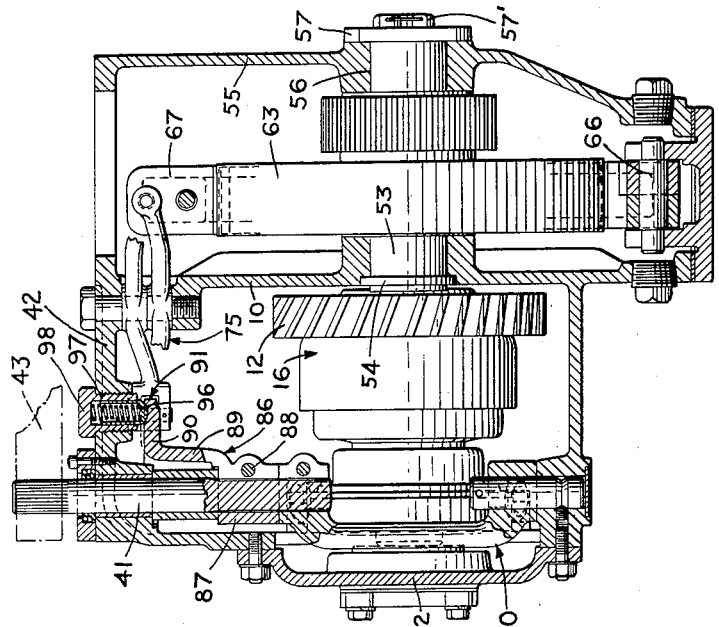
LOUIS G. HILKEMEIER
*INVENTOR.*
BY *Robert Meyer*
*Attorney*

United States Patent Office 2,758,687
Patented Aug. 14, 1956

2,758,687

TRANSMISSION

Louis G. Hilkemeier, Plainfield, N. J., assignor to Worthington Corporation, a corporation of Delaware Application March 18, 1952, Serial No. 277,241

2 Claims. (Cl. 192—4)

This invention relates generally to transmission structures and more particularly to power transmission means for vehicles including units or devices driven by power units or prime movers such as in transit type truck mixers and agitators with a power unit for driving and actuating the mixing drum.

It is known in the transmission art that where it is desired to impart clockwise or counter-clockwise motion, proper operation requires that means for braking the power transmission to the output shaft must be set up which will coact with the means or structure for reversing the direction of motion whereby when the operator is changing from one direction to the other the braking will take effect to allow for the change from one to the other direction.

Accordingly, it is the general object of the present invention to provide an improved transmission for imparting clockwise and counter-clockwise motion by means of a parallel disposed pair of clutching or planetary means which are continuously coupled with a main input shaft disposed perpendicularly to the axial planes of said clutching means and in which the driven members of the clutch structures are selectively coupled to a main driven gear in turn connected to an output shaft in a plane parallel to the planes of the clutching or planetary means and in which there is a braking means about the main driven gear which operatively engages the main driven gear for braking the same when neither of the driven means of the clutch or planetary means are in engagement with the main driven gear.

It is also particularly pointed out with reference to the modern construction of truck mixing equipment that the axial line of the mixing drums thereon are disposed at an acute angle to the vertical axial line of the prime mover. Transmissions for this type of construction now on the market have attempted to meet this problem by offsetting the axial line of the output shaft at an acute angle to the plane formed by the axial line of the input shaft. This solution of the problem has, however, presented a structure subject to severe breakdowns under the actual operating conditions of transit type truck mixers.

The present construction provides a transmission which meets this problem by its arrangement of the output shaft and clutch structures such that they be in parallel planes to each other while the input shaft is disposed perpendicularly to these planes such that by angularly displacing the housing with respect to the axial line of the input shaft and fastening it to the block of the prime mover at such angle, the entire transmission is positioned to accomplish the desired axial offsetting to transmit the power to the mixing drum in transit type truck mixers.

With these and other objects in view, as may appear from the accompanying specification, the invention consists of various features of construction and combination of parts, which will be first described in connection with the accompanying drawings, showing a transmission of a preferred form embodying the invention, and the features forming the invention will be specifically pointed out in the claims.

In the drawings:

Figure 2 is a side view of the braking mechanism.

Figure 3 is a section taken on line 3—3 of Figure 1.

Figure 1:
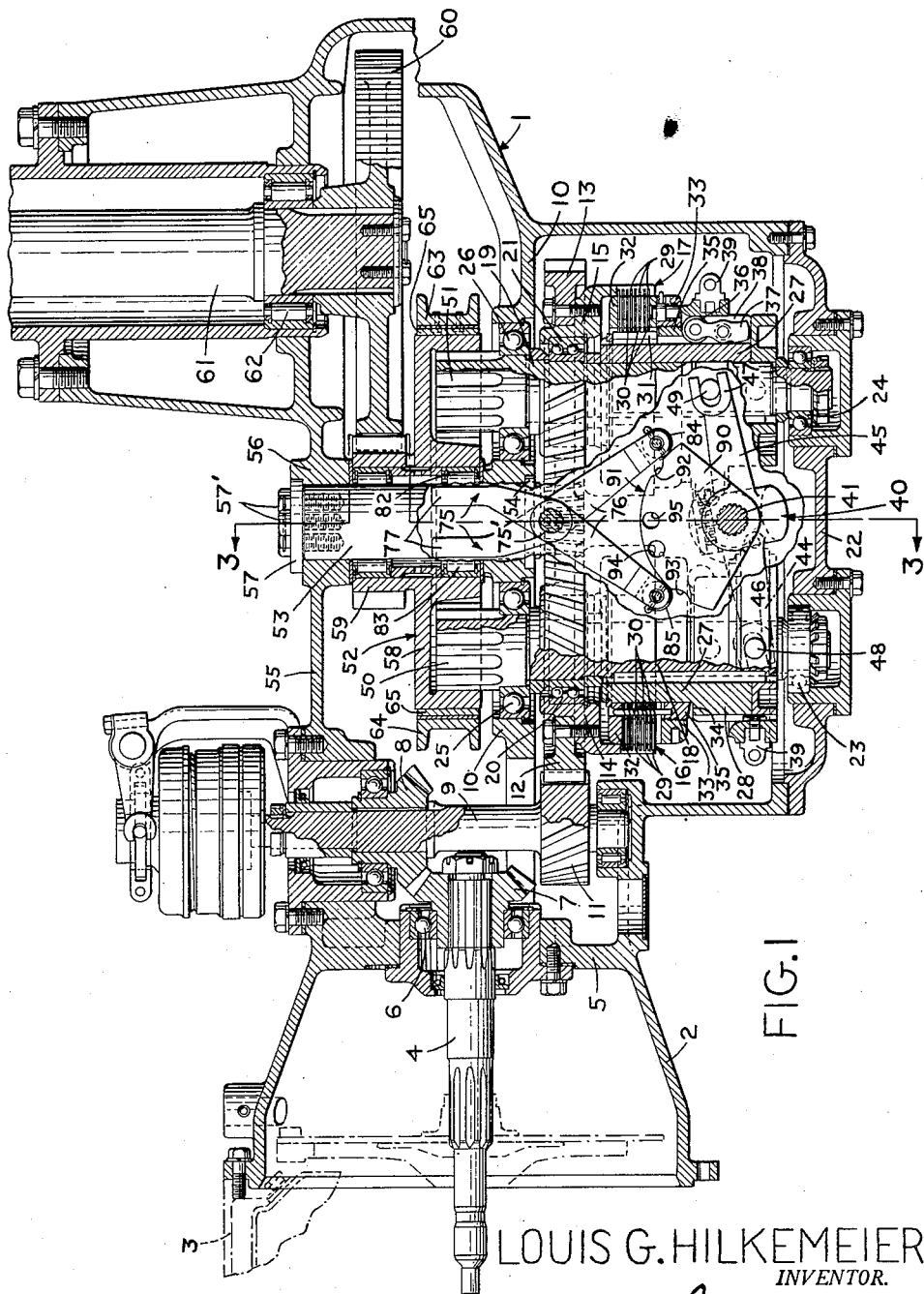
Figure 1 is a partial horizontal section taken on various gear levels through the transmission.

Referring to the drawings, Figure 1 shows a substantially hollow block-like main housing 1 which is provided with a bell housing 2 at one end thereof for mounting the main housing 1 to the block 3 of the prime mover (not shown). Only a fragment of the block 3 is shown for illustrative purposes only as this forms no part of the present invention. The bell housing 2 can, of course, be rotated to connect by suitable means to the block at any desired angle.

Extending into the main housing 1 through the bell housing 2 is an input shaft 4 which is rotatably mounted through the end wall 5 of the main housing 1 by suitable ball bearing means 6. The input shaft is connected to the prime mover drive shaft (not shown) and is rotatable therewith for receiving the power to be transmitted.

Fixedly connected to the input shaft 4 is a bevel gear 7 positioned to engage and rotate a bevel gear 8 fixedly connected to a transverse shaft 9 rotatably mounted in the main housing 1 perpendicularly to the axial line of the input shaft 4. The transverse shaft 9 extends clearly through a cross-bulkhead or keeper plate 10 disposed longitudinally in the main housing 1 in a plane parallel to the axial line of the input shaft 4. The bevel gears 7 and 8 operate on one side of the cross-bulkhead 10 and on the side opposite thereto a driving gear 11 is formed for rotation with the transverse shaft 9.

Driving gear 11 meshes continuously with gears 12 and 13 fixedly connected to and formed about cup-shaped structures 14 and 15 respectively of the clutch structures generally designated 16 and 17 in Figure 1 of the drawings.

The cup-shaped structures are freely rotatable about the parallel driven shafts 18 and 19 by means of ball bearing structures 20 and 21 respectively, as is clearly shown in Figure 1 of the drawings.

The driven shafts 18 and 19 are also rotatably mounted in the side wall 22 by suitable means 23 and 24 and in the cross-bulkhead 10 by ball bearing structures 25 and 26 so that the axial lines thereof are parallel to each other and perpendicular to the axial plane of the input shaft 4. Since the continuous gearing causes the gear members 12 and 13 and hence the cup-shaped members 13 and 14 to be rotated continuously in opposite directions, a reversible driving means through actuation of the clutch structures generally designated as 16 and 17 is afforded as hereinafter described.

The clutch structures 16 and 17 of which the cup-shaped members 14 and 15 form part thereof are identical in construction and each include hub structures 27, substantially hollow cylindrical members with a flange 28 formed about the rearward portion thereof. Hub structures 27 are keyed to the driven shafts 18 and 19 respectively.

Engagement between the driving portions of the clutch structures 18 and 19 represented by the cup-shaped members 14 and 15 and the driven portion of the clutch structures represented by the driven shafts 18 and 19 is effected through the conventional and well known friction plates or disc type of engagement. Thus, the inner walls of the cup-shaped members 14 and 15 have spaced discs 29 fixedly connected thereto, while the hub structures 27 have friction discs 30 slidably and non-rotatably mounted adjacent the forward end thereof by means of the splined portion 31 in interengaging and non-contacting relationship with the friction discs 29. Friction discs 30 are brought into frictional driving engagement when clamped between annular backing plates 32 formed on the forward end of each hub structure 27, and an annular shiftable pressure plate 33 mounted forward of the flange portions 28 on each of the hub structures 27.

The annular shiftable pressure plates 33 will be stopped on rearward movement by shoulders 34 formed by the flange portions 28 of the hubs 27. Forward movement of the annular shiftable pressure plates 33 is effected by angularly disposed rear surfaces 35 thereon adapted to coact with rollers 36 on the rocker arms 37. The rocker arms 37 are set in recesses 38 in the flange portions 28, all of which is clearly shown in Figure 1 of the drawings.

The rollers 36 on the rocker arms 37 are actuated by annular ring levers 39 slidably mounted about the flange portions 28 of the hub structures 27. When moved forward the ring levers 39 depress the rollers 36 across the angularly disposed surfaces 35 on the pressure plates 33 to produce a lever and camming action which moves the annular shiftable pressure plates 33 forward, squeezing and compressing the inter-engaging friction discs 29 and 30 against the backing plate 32 in engagement with each other.

The annular ring levers 39 may alternately be operated by a lever member 40 clearly shown in Figures 1 and 3 of the drawings which provides means for selectively engaging one or the other of the above described clutch structures 16 and 17 so that the driving means will convey rotary movement to the driven shafts 18 and 19.

*Means for selectively engaging one or the other of the clutch structures*

Lever member 40 includes a substantially eccentric vertical shaft 41 which is rotatably mounted in the housing between the driven shafts 19 and 20 perpendicular to the plane formed by axial lines of the driven shafts, and extends through the upper wall 42 of the housing 1 where it is fixedly connected to a manually operated lever means 43. Oppositely extending lever arms 44 and 45 are also provided substantially perpendicular to the vertical shaft 41. The oppositely extending lever arms 44 and 45 are further provided with forked ends 46 and 47 respectively which engage pin members 48 and 49 on the annular ring levers 39 of the clutch structures 16 and 17, all of which is clearly shown in Figures 1 and 3 of the drawings.

The lever member 40 is normally disposed so that the oppositely extending lever arms 44 and 45 will be perpendicular to the axial lines of the driven shafts 18 and 19 in which position neither of the clutch structures 16 and 17 will be in engagement. When, however, the manual lever means 43 is moved to rotate the lever member 40 and hence the oppositely disposed lever arms 44 and 45, one or the other of these lever arms will be moved forward. Since these lever arms 44 and 45 are in engagement with the pin members 48 and 49 respectively, one or the other of the annular ring levers 39 will be moved forward to actuate at least three rollers 36 on each of the clutch structures 16 and 17 and the shiftable pressure plates 33 as above described. Depending on which of the clutch structures 16 and 17 are thus engaged either driven shaft 19 or driven shaft 20 will be rotated, all of which is clearly shown in Figure 1 of the drawings.

The driven shafts 18 and 19 extend past the cross-bulkhead 10 and have formed adjacent the ends thereof gear portions 50 and 51, respectively, which engage the internally toothed portion of a main driven gear 52.

*Main driven gear*

The main driven gear 52 is rotatably mounted on a main driven gear shaft 53. Shaft 53 is disposed parallel to and coplanar with the axial lines of the respective driven shafts 18 and 19 of the clutch structures 16 and 17. One end of shaft 53 is mounted in the cross-bulkhead 10 by any suitable means such as is shown at 54, and the other end extends through a boss 56 on the sidewall 55. The main driven gear shaft 53 is held in position by lock plate 57 and threaded members 57'.

The main driven gear 52 has an annular internally toothed portion 58 formed integrally with an externally toothed reduction gear 59. The internally toothed portion 58 is in continuous engagement with the gear ends 50 and 51 of the driven shafts 18 and 19, respectively. The reduction gear 59 is in continuous engagement with a main output gear 60 which is fixedly connected to the output shaft 61 rotatably mounted in the side wall 55 parallel to the axial plane of the main driven gear shaft 53 by suitable means 62. Thus when one or the other of the driven shafts 18 and 19 are rotated by engaging one or the other of the clutch structures 16 and 17, the main driven gear 52, reducing gear 59, will be rotated either clockwise or counterclockwise, which motion is reversely transmitted through the main output gear 60 to the output shaft 61. Thus the output shaft 61 can be rotated clockwise or counterclockwise by engagement of the desired clutch structure 16 or 17 as above described.

*Automatic braking means*

In changing the direction of rotation of the output shaft it is advisable to provide an automatic braking means which will operate with or be actuated by the means for selectively engaging one or the other of the clutch structures 16 and 17.

Accordingly, Figures 2 and 3 show a pair of conventional braking shoes 63 and 64 with suitable frictional engaging material 65 on their inner surfaces. The braking shoes 63 and 64 are each pivoted at one end as at 66 below the internally toothed portion of the main driven gear 52 and extend up and about the smooth outer surface of the main driven gear 52 so that the lips 67 and 68 thereof are positioned opposite and in spaced relation to each other above the internally toothed portion of the main driven gear 52.

When the means for selectively engaging one or the other of the clutch structures is in its neutral position so that neither clutch is engaged the braking shoes 63 and 64 will be maintained in braking relation with the smooth outer surface of the main driven gear 52.

Braking relation is maintained by a spring 69 mounted about the threaded end of an elongated member generally designated at 70 provided with a head end 71 adapted to abut the back end of the lip 67 so that the elongated shank portion 72 extends through and through the lips 67 and 68 substantially perpendicularly to the axial line of the main driven gear shaft 53. Spring member 69 mounted about the elongated shank 72 where it extends past the lip 68 is adapted to abut the back of the lip 68 and the tension of the spring member 69 can be adjusted by a nut member 73 and locking member 74 which holds the spring member in its adjusted position, all of which is clearly shown in Figure 2 of the drawings.

The brake shoes 63 and 64 are automatically actuated out of braking relation with the main driven gear 52 by scissors levers 75.

Scissors levers 75 includes two angled legs pivotally mounted at 75', which legs are identical in construction including a long portion 76 and a short portion 77 at an obtuse angle thereto. The short portions 77 lie in the space between the lips 67 and 68 and abut adjustable members 78 and 79 threaded through the respective lips 67 and 68. Locking nuts 80 and 81 are provided for each of said members to hold them in adjusted position so that abutting head portions 82 and 83 will be held in their desired position with respect to the short portions 77 of the scissors lever 75, all of which is clearly shown in Figures 1 and 2 of the drawings.

The long portions 76 of the legs of scissors levers 75 extend rearwardly and have rollers 84 and 85 mounted on their rearmost ends. These rollers 84 and 85 will be in spaced relation above the clutch structures 16 and 17, the spaced relation being determined by the obtuse angle between the long portion 76 and the short portion 77, which provides a suitable ratio, predetermined by the desired opening motion needed for forcing the lips 67 and 68 apart and hence the brake shoes 63 and 64 out of braking engagement with the main driven gear 52.

The spreading motion which will actuate the long legs 76 and thus take the brake shoes out of braking engagement with the main driven gear 52 is accomplished by a goose-necked cam member 86 which contacts and spreads the rollers 84 and 85 by a camming action hereinafter described.

The goose-necked cam member 86 is shown in Figures 1 and 3, and includes a hollow cylindrical portion 87 which allows the cam member 86 to be mounted on the perpendicular or vertical shaft 41 of the lever member 40 and to be locked thereto by a locking screw 88 and a throat portion 89 formed integrally with the cylindrical portion 87 extends upwardly and forwardly to meet and form a continuous member with an arcuate flat cam plate 90.

Figure 1 clearly shows the cam plate 90 as an arcuate member having an arc approximating one-third of a circle, the leading edge 91 of which is in contact with the rollers 84 and 85. Recesses 92 and 93 are formed in the leading edge 91 in spaced relation to each other such that when the lever 40 is in a neutral position, that is, neither of the clutch structures 16 and 17 are in engagement, the recesses will engage the rollers 84 and 85 and the legs of the scissors lever 75 will not be spread apart, allowing the brake shoes 63 and 64 to engage the smooth exterior surface of the main driven gear 52 about the internally toothed portion 58 thereof in braking engagement.

If, however, the lever 40 is rotated by the manual lever 43, the vertical shaft 41, will rotate the goose-necked cam lever 86 and hence the flat cam plate 90 so that the rollers 84 and 85 will be moved out of the recesses 92 and 93 causing the legs of the scissors lever 75 to be spread and hence spreading the brake shoes 63 and 64 through the abutting heads 82 and 83 on threaded members 78 and 79 in the lips 67 and 68 of the respective brake shoes, taking these brake shoes 63 and 64 out of braking engagement with the main driven gear 52.

The manual lever 43 can of course be moved in either direction and the camming action caused by the rollers 84 and 85 moving out of the recesses 92 and 93 will give the same result in either case. However, the back pressure of spring 69, requires that locking means be provided to hold the means for selecting one or the other of the clutch structures in the desired position other than by mere manual force. This is accomplished by two notches 94 and 95 on the upper surface of the flat cam plate 90, which lie on either side of a line perpendicular to the longitudinal plane formed by the oppositely extending lever arms 44 and 45. These notches 94 and 95 represent the selective position wherein one or the other of the clutches 16 and 17 are engaged. They are engaged by a pawl 96 and spring 97 arrangement mounted in a suitable housing 98 threaded in the upper wall 42 of the main housing 1.

While the present preferred form of the invention is illustrated with clutch structures it is believed obvious that planetary type gearing could be substituted therefor so that the selective means would brake one or the other to accomplish the desired result of driving the main driven gear in either a clockwise and counter-clockwise direction, and would coact with the same braking arrangement operating as above described without departing from the spirit or teachings of this invention.

It will be further understood that the invention is not therefore to be limited to the specific construction or arrangement of parts shown, but that they may be widely modified within the invention defined by the claims.

What is claimed is:

1. In a transmission an input shaft, an output shaft, and a main driven gear coupled with said output shaft, a pair of rotatable co-planar shafts in continuous engagement with said main driven gear, a clutch structure for each of said co-planar shafts having the driven member thereof fixedly connected and rotatable with its respective rotatable shaft, the driving members of said clutch structures continuously coupled with each other and with said input shaft for rotation in opposite directions, braking means for said main driven gear normally in braking engagement therewith, a rotatable lever member having oppositely disposed arms each adapted to actuate one of said clutch structures at a time on rotation of said lever member in either direction, a cam means fixedly connected and rotatable with said lever member, scissors levers having obtusely angled legs, said legs having one end in operative engagement with said cam means and to be separated when said cam is rotated to selectively engage either of said clutch structures, and the other end of said legs mounted to operatively engage the braking means for releasing the braking means on rotation of said cam member.

2. In a transmission having a main housing with a bell housing at one end for angularly positioning the transmission, an input shaft extending through said bell housing journaled in said end of the main housing, a transverse shaft in said main housing coupled with said input shaft, an output shaft remote from said input shaft in said housing, and reversible gearing coupling said transverse shaft to said output shaft including a main driven gear coupled with said output shaft, two clutch structures selectively coupled with said main driven gear for rotating said main driven gear in either direction, a braking means for the main driven gear, a rotatable lever member having oppositely disposed arms each adapted to actuate one of said clutch structures at a time on rotation of said lever member in either direction, cam means fixedly connected and rotatable with said lever member, scissors levers having obtusely angled legs, said legs having one end in operative engagement with said cam means and to be separated when said cam is rotated, and the other end of said legs mounted to operatively engage the braking means for releasing the braking means on rotation of the said cam member, said clutch structures having their driving means continuously coupled with each other and with said transverse driving shaft for rotation in opposite directions, and said transverse driving shaft said clutch structures said main driven gear and said output shaft having axial planes perpendicular to the axial line of said input shaft.

References Cited in the file of this patent

UNITED STATES PATENTS

| | | |
|---|---|---|
| 2,106,958 | Pettit | Feb. 1, 1938 |
| 2,303,319 | Beardsley | Dec. 1, 1942 |
| 2,426,160 | Berndtson | Aug. 26, 1943 |
| 2,443,313 | Gerst | June 15, 1948 |
| 2,546,063 | Gerst | Mar. 20, 1951 |
| 2,546,064 | Gerst | Mar. 20, 1951 |